US006549574B1

(12) United States Patent
De Bart et al.

(10) Patent No.: US 6,549,574 B1
(45) Date of Patent: Apr. 15, 2003

(54) TRANSMISSION SYSTEM WITH IMPROVED RECEIVER

(75) Inventors: Abraham Jan De Bart, Eindhoven (NL); Arie Geert Cornelis Koppelaar, Eindhoven (NL); Constant Paul Marie Jozef Baggen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 175 days.

(21) Appl. No.: 09/610,713

(22) Filed: Jul. 6, 2000

(30) Foreign Application Priority Data

Jul. 8, 1999 (EP) .............................................. 99202236

(51) Int. Cl.[7] .............................. H04B 1/66; H04N 7/12; G06K 9/36
(52) U.S. Cl. .................. 375/240.05; 382/239; 382/251; 348/385.1
(58) Field of Search ........................ 375/240.03, 240.11, 375/240.04, 240.05; 348/423.1, 425.2, 385.1; 382/236, 239, 238, 251; 358/430; 704/229, 212, 230

(56) References Cited

U.S. PATENT DOCUMENTS

| | | | | |
|---|---|---|---|---|
| 4,713,776 A | * | 12/1987 | Araseki | 375/240.03 |
| 4,897,855 A | | 1/1990 | Acampora | 375/27 |
| 5,144,424 A | * | 9/1992 | Savatier | 375/240.03 |
| 5,666,170 A | | 9/1997 | Stewart | 348/726 |
| 5,802,213 A | * | 9/1998 | Gardos | 375/240.03 |
| 6,037,985 A | * | 3/2000 | Wong | 375/240.03 |
| 6,415,057 B1 | * | 7/2002 | Suzuki et al. | 382/239 |

FOREIGN PATENT DOCUMENTS

WO    WO9812818    3/1998

OTHER PUBLICATIONS

Yasuda Y Et Al: "Optimum Soft Decision for Viterbi Decoding" Genoa, Mar. 23–26 1981, New York, I.E.E.E, US, vol. Conf. 5, pp. 251–258.

I. M. Onyszchuk, K.M. Cheung, O. Collins: "Quantization Loss in Convolutional Decoding" IEEE Transactions on Communications vol. 41, No. 2, Feb. 1993, pp. 261–265.

* cited by examiner

Primary Examiner—Gims S. Philippe
(74) Attorney, Agent, or Firm—Daniel J. Piotrowski

(57) ABSTRACT

In a transmission system for digital symbols, such as used for DVB, source symbols are encoded by a block coder (4), subjected to an interleaving operation in an interleaver and subsequently encoder in a channel encoder (8) according to one out of a plurality of possible channel codes. The output symbols of the channel encoder (8) are applied to transmit means (10). These output symbols are modulated on a carrier and applied to an antenna (12). An antenna (14) connected to a receiver (16) receives the signal transmitted by the antenna (12). Receive means (18) are arranged for amplifying and demodulating the signal received from the antenna (14). The output of the receive means (18) are applied to quantizing means (20) which convert its input signal into a quantized digital signal, before applying it to a Viterbi decoder 22. The complexity of the Viterbi decoder 22 depends on the number of quantization levels at the output of the quantization means (20). Consequently, this number of quantization levels should be not too high. On the other hand a too low number of quantization levels results in a degradation of the performance of the Viterbi detector (22). A suitable choice of the quantization levels depends also on the channel code used. According to the inventive concept of the present invention, the quantization levels are chosen in dependence on the channel code used. This channel code can be represented by the puncturing rate. In a preferred embodiment the quantization means are realized by a cascade connection of an analog to digital converter (34) and translation means (36). The translation means (36) converts the constant quantization levels at the output of the analog to digital converter (34) into quantization levels which depend on the working point of the channel code used.

10 Claims, 1 Drawing Sheet

TRANSMISSION SYSTEM WITH IMPROVED RECEIVER

BACKGROUND OF THE INVENTION

The present invention relates to a transmission system comprising a transmitter with a channel encoder for deriving encoded digital symbols encoded according to one out of a plurality of channel codes from source symbols, the transmitter further comprises transmit means for transmitting the encoded digital symbols via a transmission medium to a receiver, the receiver comprises receive means for receiving a signal representing the encoded digital symbols from the transmission medium, the receiver further comprises quantization means for deriving a quantized signal being quantized in a plurality of quantization levels from the signal representing the encoded digital symbols, and a decoder for deriving an estimate of the source symbols from the quantized signal.

The invention also relates to a receiver, a decoding arrangement and a decoding method.

A transmission system according to the preamble is known from U.S. Pat. No. 5,666,170.

Such transmission systems can be used for transmitting digital video signals or data signals which are represented by source symbols, via a transmission medium such as a satellite channel, a terrestrial channel or a CATV channel. In order to ensure a virtual error free transmission of the source symbols, channel coding is used. This channel coding often includes the use of a concatenated coding scheme. This concatenated coding scheme involves the encoding of the source symbols using an outer channel code, and encoding the output symbols of the outer encoder by an inner code. The outer code is often a block code such as a Reed-solomon code, and the inner code is often a convolutional code. It is also possible that between outer coding and inner coding interleaving is used in order to spread burst errors over time.

In the receiver, the signal representing the encoded digital symbols is quantized and converted into a digital signal in order to exploit the advantages of present day digital signal processing techniques. The quantized digital signal is applied to the decoder for the selected (inner) channel code which derives decoded symbols from its input signal. It is observed that the present invention is not limited to the case where concatenated coding is used, but is also applicable when only one single channel code with soft decision decoding is used.

The number of quantization steps to be used in said quantization should be selected adequately. A high number of quantization steps results in an increased complexity of the digital circuitry used in the decoder. A too low number of quantization steps results in a performance degradation of the decoder. Furthermore, this trade-off depends also on the used channel code.

SUMMARY OF THE INVENTION

It is an object of the present invention to provide a transmission system according to the preamble with quantization levels which are appropriate for all channel codes. To achieve said object, the present invention is characterized in that the receiver comprises quantization control means for setting a ratio between a signal level at the input of the quantization means and said quantization levels to a value being dependent on the channel code.

The present invention is based on the recognition that for each channel code a working point represented by the value of $E_b/N_0$ can be defined for which the performance in the complete system is sufficient. To avoid unnecessary system-degradation, the quantization steps are optimized for a decoder operating at the working point. By setting the ratio between the signal level at the input of the quantization means and the quantization steps in dependence on the channel code, it is obtained that the quantization steps have optimum values for all channel codes on or near the working point.

An embodiment of the invention is characterized in that the quantizing means comprise a quantizer for quantizing the signal representing the encoded digital symbols independently from the channel code, and in that the quantization means comprise translation means for translating an output signal of the quantizer into a quantized signal having a ratio between a signal level at the input of the quantization means and said quantization levels to a value being dependent on the channel code.

This embodiment of the invention enables the use of standard analog to digital converters for performing a quantization independent of the channel code. Subsequently, the translation means translate the output signal of the quantizer into a signal that is quantized in dependence on the channel code.

A further embodiment of the invention is characterized in that the number of quantization levels at the output of the quantization means is equal to 16.

It has been shown by experiments that by applying the teaching of the present invention the number of quantization levels can be reduced to 16, without significant degradation of the performance of the decoder.

BRIEF DESCRIPTION OF THE DRAWINGS

The present invention will now be explained with reference to the drawings.

DESCRIPTION OF THE PREFERRED EMBODIMENTS

Figure 1:
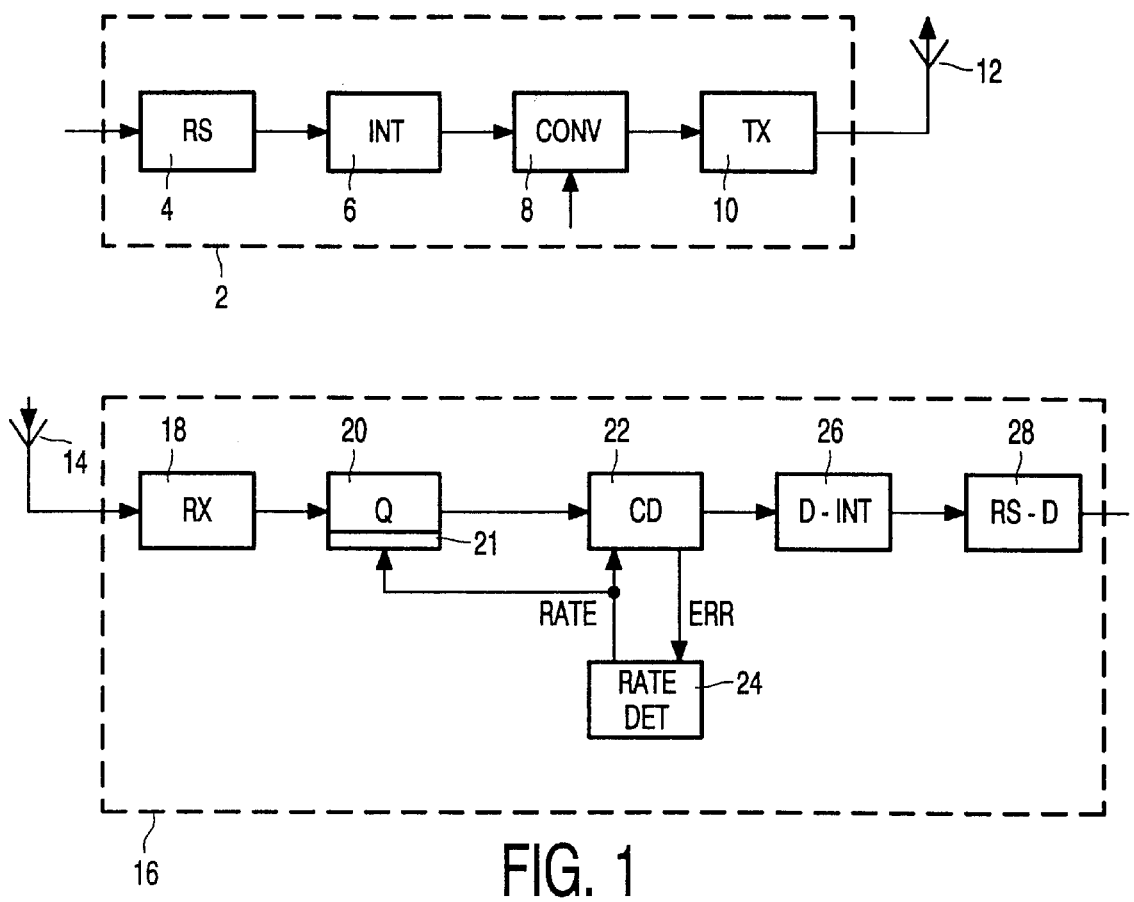
FIG. 1 shows a block diagram of a transmission system according to the present invention.

In the transmission system according to FIG. 1, the digital symbols to be transmitted are applied to a Reed-Solomon encoder 4 in a transmitter 1. The Reed-Solomon encoder 4 adds a number of parity symbols to fixed length words that comprise the symbols to be transmitted.

The encoded symbols at the output of the Reed-Solomon encoder 4 are applied to an input of an interleaver 6. This interleaver 6 spreads the symbols of the codewords provided by the Reed-Solomon decoder 4 over time in order to decrease the vulnerability for burst errors.

The output symbols of the interleaver 6 are applied to a convolutional encoder 8, which encodes said output symbols of the interleaver 6 according to a convolutional code with a rate which is determined by a signal RATE applied to a control input. In transmission systems like DVB it is desirable to provide a choice for the transmitter operator between a plurality of rates of the convolutional code. This enables the operator to make a trade off between the net bit rate and the required $E_B/N_0$ at the receiver. In DVB a base convolutional code with a rate of ½ is used, which rate can be increased to ⅔, ¾, ⅚ and ⅞ by suitable puncturing.

The output of the convolutional encoder 8 is connected to an input of the transmit means 10 which modulate the output symbols of the convolutional encoder 8 on a carrier using a suitable modulation scheme. For DVB-Satellite the used modulation scheme is 4-PSK, for DVB-Terrestrial this is OFDM with 2K or 8K carriers and for DVB-Cable this is 16-QAM or 64-QAM. The output of the transmit means 10 is coupled to the transmission medium by means of the antenna 12.

An antenna 14 is arranged for receiving the signal transmitted by the transmitter 2 using the antenna 12. The output of the antenna 14 is connected to the input of a receiver 16. The receive means 18 in the receiver 16 are arranged for amplifying and demodulating the signal received from the antenna 14.

The output signal of the receive means 18 is converted into a digital signal which is quantized into a number of quantization levels by the quantization means 20. The output of the quantization means 20 is connected to an input of a Viterbi decoder 22 which derives decoded symbols from its input signal.

It is conceivable that a digital demodulator is used. In that case the analog to digital converter is present in front of the digital demodulator.

At a first output of the Viterbi decoder 22 the decoded output symbols are available, and at a second output of the Viterbi detector 22 a signal ERR is available which represents an error signal which is a measure of the difference between the actual input signal and an ideal input signal which would be present at the input when the input signal was noise-free. This error signal can easily be derived from the path metric of the best survivor in the Viterbi detector.

This error signal ERR is applied to a rate detector which determines the rate of the actually used convolutional code from the error signal. This is needed, because in DVB no signaling information indicating the rate of the convolutional code is transmitted.

By trying all possible rates, and comparing the error signal for the different rates it is possible to determine the rate actually used. This is the rate resulting in the smallest increase in the error signal during a predetermined amount of time. The operation of the rate detector 24 is explained in more detail in WO 98/12818.

According to the inventive idea of the present invention, the signal RATE, indicating the rate of the used channel code is also applied to the quantizing means 20 in order to adapt the ratio between the input signal of the quantizing means 20 and the quantization levels to the used channel code.

For a PSK input signal with additive white Gaussian noise, the decision levels $T_i$ separating the quantization levels in the quantizing means 20 should be equal to:

$$T_i = i \cdot \sqrt{a \cdot \frac{N_0}{2}}; \quad i = -\frac{Q}{2}+1, \; \frac{Q}{2}, \ldots, -1, 0, +1, \ldots, \; \frac{Q}{2}-1 \quad (1)$$

In (1) Q is the number of quantization steps, $N_0$ is the two sides spectral power density and a is an empirical constant. This constant a should be equal to 0.6 for quantization in 3 bits (8 levels) and should be equal to 0.33 for quantization into 4 bits (16 levels).

The problem with the above selection of the quantization levels is that an AGC circuit would be needed that operates on noise only. This is not practical, because this would likely lead to overload of the digital circuitry in the case of a high signal to noise ratio. Therefore, the decision levels are determined for the noise level which is present for the "working point" of the decoder which is defined by $E_S/N_0$. $E_S$ is here the signal energy per bit. In practice this working level is chosen to obtain a bit error rate around $10^{-3}$ after the convolutional decoder.

In the table below, the threshold levels for quantization in 3 and 4 bits are given for the rates present in the DVB satellite standard. For this table it is assumed that the input signal of the quantizer has a range between $-4\sqrt{E_S}$ and $+4\sqrt{E_S}$.

| Rate | Working point (dB) | Threshold (3 bits) | Threshold (4 bits) |
|---|---|---|---|
| ½ | 2.1 | 8/16 | 4/16 |
| ⅔ | 3.7 | 6/16 | 3/16 |
| ¾ | 4.8 | 6/16 | 3/16 |
| ⅚ | 5.9 | 5/16 | 3/16 |
| ⅞ | 6.5 | 5/16 | 2/16 |

The output signal of the Viterbi detector 22 is applied to a de-interleaver 26 which performs an operation which is inverse to the operation of the interleaver 6. The output signal of the de-interleaver 26 is applied to a Reed-Solomon decoder 28 which derives from its input signal a replica of the symbols applied at the input of the transmitter 2.

Figure 2:
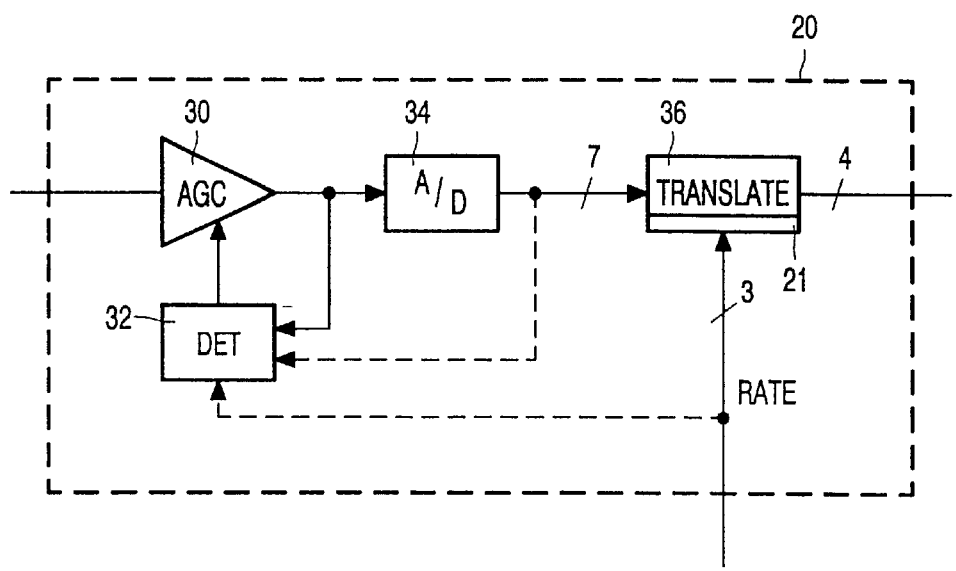
FIG. 2 shows a more detailed diagram of the quantization means 20 in FIG. 1.

In the quantization means 20 according to FIG. 2, the input signal is applied to an input of an AGC amplifier 30. The output of the AGC amplifier 30 is connected to an input of an analog to digital converter 34 and to an input of an AGC detector 32. An output of the AGC detector 32 is connected to a control input of the AGC amplifier 30. The AGC detector 32 determines the signal level at the output of the AGC amplifier and compares it with a threshold value. The result of this comparison is used to control the gain of the AGC amplifier such that its output signal is substantially constant. Alternatively, it is possible that the AGC controller 32 uses the output signal of the analog to digital converter 34 instead or in addition to the output signal of the AGC amplifier to control said AGC amplifier.

The analog to digital converter 34 converts its input signal into a digital signal represented by 7 bits. The output of the analog to digital converter 34 is connected to an input of the translation unit 36. This translation means translate the signal represented by 7 bits into a signal represented by 4 bits by using the rate signal according to the inventive idea of the present invention. The quantization control means 21 cause the output signal of the translation means to be dependent on the signal RATE.

The translation means 36 can be implemented by using a ROM memory where the 7 bits representing the output signal of the analog to digital converter 34 and the three bits representing the signal RATE are used as address signal to address the ROM memory which provides a three bits signal in response to said address signal. Alternatively, the translation means 36 can be implemented using simple control logic.

Instead of using the translation means 36 to obtain a desired ratio between the input level of the quantization means 20 and the quantization levels, it is also possible to control the output level of the AGC amplifier 30 in dependence on the used channel code which is defined here by the puncturing rate. This can be easily realized by setting the value of the thresholds used in the AGC detector 32 in dependence on the puncturing rate.

What is claimed is:
1. Transmission system comprising a transmitter with a channel encoder for deriving encoded digital symbols encoded according to one out of a plurality of channel codes from source symbols, the transmitter further comprises transmit means for transmitting the encoded digital symbols via a transmission medium to a receiver, the receiver comprises receive means for receiving, a signal representing the encoded digital symbols from the transmission medium, the receiver further comprises quantization means for deriving a quantized signal being quantized in a plurality of quantization levels from the signal representing the encoded digital symbols, and a decoder for deriving an estimate of the source symbols from the quantized signal, characterized in that the receiver comprises quantization control means for setting a ratio between a signal level at the input of the quantization means and said quantization levels to a value being dependent on the channel code.

2. Transmission system according to claim 1, characterized in that the quantizing means comprise a quantizer for quantizing the signal representing the encoded digital symbols independently from the channel code, and in that the quantization means comprise translation means for translating an output signal of the quantizer into a quantized signal having a ratio between a signal level at the input of the quantization means and said quantization levels to a value being dependent on the channel code.

3. Transmission system according to claim 1, characterized in that the number of quantization levels at the output of the quantization means is equal to 16.

4. Receiver comprises receive means for receiving a signal representing encoded digital symbols being encoded according to one out of a plurality of channel codes, the receiver further comprises quantization means for deriving a quantized signal being quantized in a plurality of quantization levels from the signal representing the encoded digital symbols, and a decoder for deriving an estimate of the source symbols from the quantized signal, characterized in that the receiver comprises quantization control means for setting a ratio between a signal level at the input of the quantization means and said quantization levels to a value being dependent on the channel code.

5. Receiver according to claim 4, characterized in that the quantizing means comprise a quantizer for quantizing the signal representing the encoded digital symbols independently from the channel code, and in that the quantization means comprise translation means for translating an output signal of the quantizer into a quantized signal having a ratio between a signal level at the input of the quantization means and said quantization levels to a value being dependent on the channel code.

6. Receiver according to claim 5, characterized in that the number of quantization levels at the output of the quantization means is equal to 16.

7. Decoding arrangement for decoding a signal representing encoded digital symbols being encoded according to one out of a plurality of channel codes, the decoding arrangement further comprises quantization means for deriving a quantized signal being quantized in a plurality of quantization levels from the signal representing the encoded digital symbols, and a decoder for deriving an estimate of the source symbols from the quantized signal, characterized in that the decoding arrangement comprises quantization control means for setting a ratio between a signal level at the input of the quantization means and said quantization levels to a value being dependent on the channel code.

8. Decoding arrangement according to claim 7, characterized in that the quantizing means comprise a quantizer for quantizing the signal representing the encoded digital symbols independently from the channel code, and in that the quantization means comprise translation means for translating an output signal of the quantizer into a quantized signal having a ratio between a signal level at the input of the quantization means and said quantization levels to a value being dependent on the channel code.

9. Decoding arrangement according to claim 5, characterized in that the number of quantization levels at the output of the quantization means is equal to 16.

10. Method for decoding a signal representing encoded digital symbols being encoded according to one out of a plurality of channel codes, the method for decoding further comprises deriving a quantized signal being quantized in a plurality of quantization levels from the signal representing the encoded digital symbols, and deriving an estimate of the source symbols from the quantized signal, characterized in that the method for decoding comprises setting a ratio between a signal level at the input of the quantization means and said quantization levels to a value being dependent on the channel code.

* * * * *